United States Patent
Krych et al.

(10) Patent No.: US 12,509,002 B2
(45) Date of Patent: Dec. 30, 2025

(54) HOLDER FOR A CAMERA AND A GPS SENSOR

(71) Applicant: Bayerische Motoren Werke Aktiengesellschaft, Munich (DE)

(72) Inventors: Tim Krych, Munich (DE); Mathias Muehlmann, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 18/287,208

(22) PCT Filed: Apr. 8, 2022

(86) PCT No.: PCT/EP2022/059426
§ 371 (c)(1),
(2) Date: Oct. 17, 2023

(87) PCT Pub. No.: WO2022/242958
PCT Pub. Date: Nov. 24, 2022

(65) Prior Publication Data
US 2024/0208431 A1 Jun. 27, 2024

(30) Foreign Application Priority Data
May 19, 2021 (DE) ............... 10 2021 112 926.5

(51) Int. Cl.
*B60R 11/04* (2006.01)
*B60R 11/00* (2006.01)
*B62J 45/42* (2020.01)

(52) U.S. Cl.
CPC ............... *B60R 11/04* (2013.01); *B62J 45/42* (2020.02); *B60R 2011/004* (2013.01); *B60R 2011/0071* (2013.01)

(58) Field of Classification Search
CPC ............... B60R 11/04; B60R 2011/004; B60R 2011/0071; B62J 45/42
See application file for complete search history.

(56) References Cited

U.S. PATENT DOCUMENTS

| | | | | |
|---|---|---|---|---|
| 5,911,395 A | * | 6/1999 | Hussaini | F16M 11/40 248/316.4 |
| 6,561,400 B2 | * | 5/2003 | Lee | B62J 7/06 224/420 |
| 8,393,584 B2 | * | 3/2013 | Burns | F16M 11/26 248/205.5 |
| 9,573,531 B2 | * | 2/2017 | Zhang | F16M 11/16 |

(Continued)

FOREIGN PATENT DOCUMENTS

WO   WO 2020/099310 A1   5/2020

OTHER PUBLICATIONS

International Search Report (PCT/ISA/210) issued in PCT Application No. PCT/EP2022/059426 dated Aug. 12, 2022 with English translation (4 pages).

(Continued)

*Primary Examiner* — Anita M King
(74) *Attorney, Agent, or Firm* — Crowell & Moring LLP

(57) ABSTRACT

A holder is provided for the combined holding of a camera and a GPS sensor in a motor vehicle, in particular a motorcycle. The holder includes a clamping device for fixing the camera and a receptacle for the GPS sensor. The holder is arranged on a cladding component.

12 Claims, 6 Drawing Sheets

(56) References Cited

U.S. PATENT DOCUMENTS

| | | |
|---|---|---|
| 10,066,786 B1 | 9/2018 | Cox |
| 2012/0327234 A1 | 12/2012 | Fish, Jr. et al. |
| 2017/0257535 A1 | 9/2017 | Minikey, Jr. et al. |
| 2017/0264822 A1 | 9/2017 | Shen et al. |
| 2018/0341289 A1 | 11/2018 | Schachter et al. |

OTHER PUBLICATIONS

German-language Written Opinion (PCT/ISA/237) issued in PCT Application No. PCT/EP2022/059426 dated Aug. 12, 2022 with English translation (9 pages).

German-language Search Report issued in German Application No. 10 2021 112 926.5 dated Jan. 11, 2022 with partial English translation (10 pages).

\* cited by examiner

HOLDER FOR A CAMERA AND A GPS SENSOR

BACKGROUND AND SUMMARY OF THE INVENTION

The invention relates to a holder for the combined holding of a camera and of a GPS sensor on a motor vehicle, in particular a motorcycle, wherein the holder comprises a clamping apparatus for fixing of the camera and a receptacle for the GPS sensor.

During motorcycling, but also in other types of sport, action cameras are used to capture rides or the like. In order to record lap times on race tracks, a GPS sensor is required. Both components have to be securely fastened to the vehicle.

Holders for cameras in particular on motorcycles are known, said holders being fastened to protruding components, e.g. the mirrors, by screw adapters. Other known holders are, in turn, adhesively bonded to cladding parts in the rear or front region. There are no predefined fastening possibilities for GPS sensors, therefore in the majority of cases these are fixed at suitable locations by cable ties, adhesive tape or hook-and-loop fasteners.

This has the disadvantage that both devices have to be attached separately from one another and a fastening by adhesive tape or the like does not offer the desired security.

It is therefore the object of the invention to provide a holder which can be used to securely fasten both a camera and a GPS sensor to the vehicle.

The object is achieved by way of a holder for the combined holding of a camera and of a GPS sensor on a motor vehicle, in particular a motorcycle, wherein the holder comprises a clamping apparatus for fixing of the camera and a receptacle for the GPS sensor, wherein the holder is provided with a fastening shaping for fastening the holder to a cladding component, said fastening shaping being able to be used to fasten the holder to the cladding component in a form-fitting manner. Such a combined holder makes it possible to securely fasten both a camera and a GPS sensor to the vehicle. As a result, a second holder or the non-secure and unesthetic fastening of a GPS sensor by adhesive tape or the like is omitted.

Furthermore, the holder itself can be fastened to a cladding component in a form-fitting manner, as a result of which the holder is optimally integrated into the vehicle system and thus is also securely fastened.

An aspect of the invention is that a cover with an opening and at least one fastening tab is arranged on the holder. Such a cover offers protection for the holder and improves the visual impression of the cladding of the vehicle.

In one embodiment of the invention, the clamping apparatus for fixing of the camera comprises a cable leadthrough for a cable of the GPS sensor. As a result, improper cable kinking of the cable running from the GPS sensor is avoided.

Preferably, the clamping apparatus is in the form of a projection with a passage opening for a fastener. This shaping constitutes a simple connecting possibility which can be used to securely fasten the majority of cameras available on the market.

In one embodiment of the invention, the receptacle for the GPS sensor is of shell-like form. As a result, the position of the GPS sensor is reliably defined in a simple manner and the GPS sensor does not protrude too greatly from the holder.

Preferably, the receptacle for the GPS sensor comprises a base with a fastener. It is thus possible for the GPS sensor to be securely fixed in the receptacle.

In one embodiment, the fastener is in the form of a magnet or hook-and-loop fastener. These configurations constitute a particularly simple and favorable fastening possibility and can be easily integrated into the receptacle.

Preferably, the holder is fastened to the cladding component by a screw connection. In this way, the holder is securely fastened to the cladding in a simple manner.

In one embodiment variant, the cladding component is an outer cladding, in particular a rear cladding. The fastening of the holder to the outer cladding, in particular to the rear cladding, enables a simple construction.

The object is furthermore also achieved according to embodiments of the invention by a motor vehicle, in particular a motorcycle, with a cladding component and a holder for the combined holding of a camera and of a GPS sensor, wherein the holder comprises a clamping apparatus for fixing of the camera and a receptacle for the GPS sensor, wherein the holder is arranged on the cladding component. The advantages which have been discussed in relation to the holder self-evidently also apply to the motor vehicle.

Further features and advantages of the invention will emerge from the following description and from the attached drawings to which reference is made.

DETAILED DESCRIPTION OF THE DRAWINGS

Figure 1:
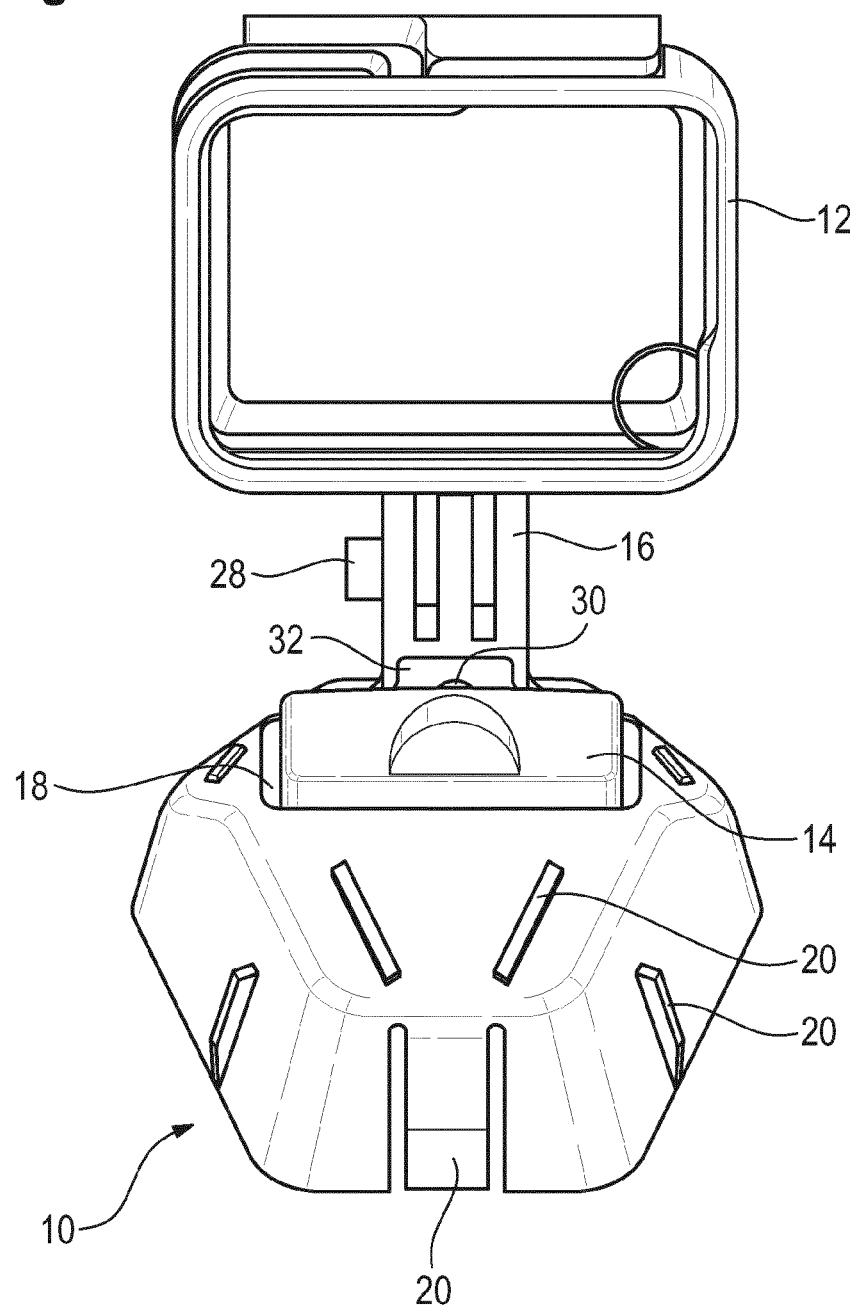
FIG. 1 shows a front view of a holder according to an embodiment of the invention with camera and GPS sensor.
Figure 2:
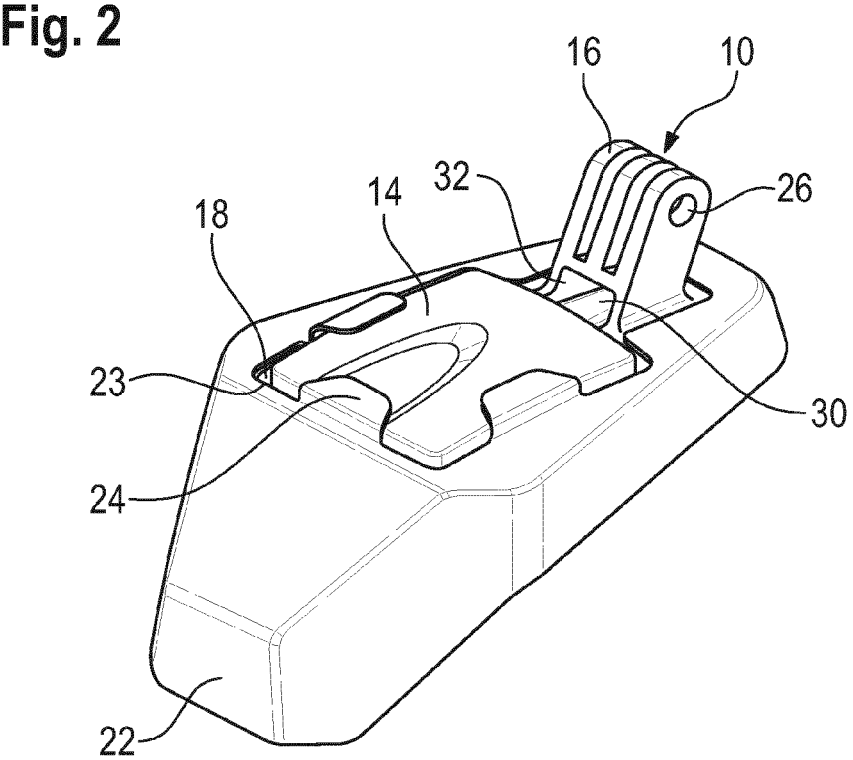
FIG. 2 shows a perspective view of a holder according to an embodiment of the invention with a cover and GPS sensor.
Figure 3:
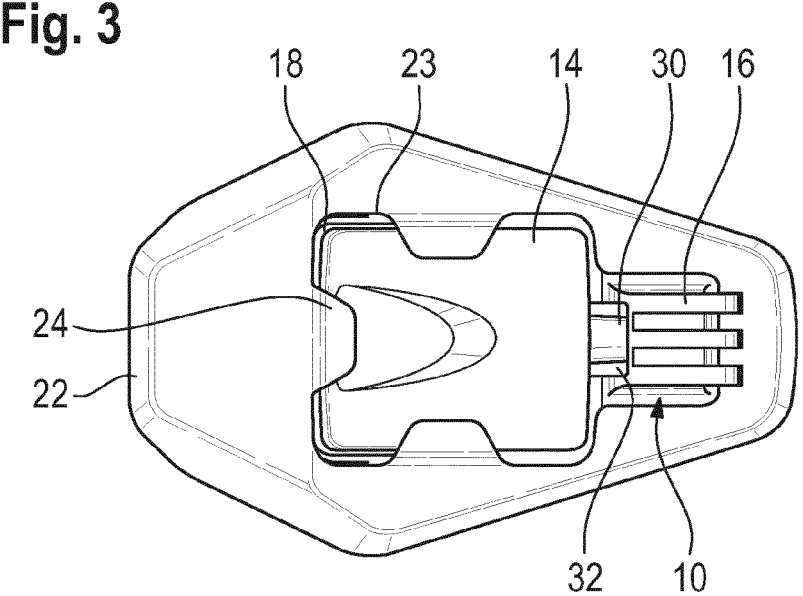
FIG. 3 shows a top view of the holder from FIG. 2.
Figure 4:
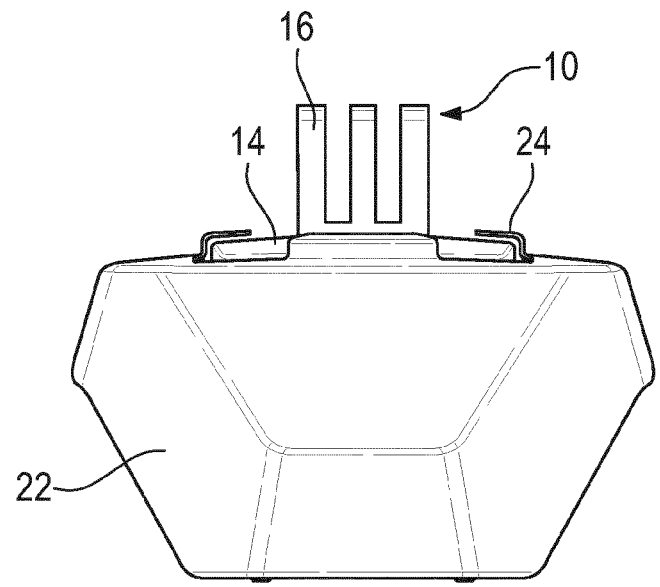
FIG. 4 shows a front view of the holder from FIG. 2.

In FIG. 1, a holder 10 can be seen, on which a camera 12, wherein here only the camera frame is illustrated, and a GPS sensor 14 are arranged. The camera 12 is fastened to the holder 10 by way of a clamping apparatus 16. The GPS sensor 14 is positioned in a receptacle 18.

In this case, both the camera 12 and the GPS sensor 14 are configured such that they are suitable for external use on a vehicle, in particular on a motorcycle, and withstand e.g. strong vibrations, and also poor weather conditions. Here, the camera 12 is in particular an action camera. The GPS sensor 14 is in the form of a pure GPS sensor, e.g. in the form of a "GPS mouse".

The holder 10 comprises a plurality of fasteners 20 for fastening of a cover 22 (see e.g. FIGS. 2 to 6). The fasteners 20 here are in the form e.g. of ribs and a tab. In the embodiment shown, the cover 22 is clipped onto the holder 10 by way of the fastener 20. However, it is also conceivable for the cover 22 to be connected to the holder 10 in some other way, e.g. by screw fastening.

The cover 22, which in the embodiment shown consists of a carbon material, serves as protection for the holder 10 and comprises an opening 23 from which the GPS sensor 14 and the clamping apparatus 16 protrude. As a result, the reception of the GPS sensor 14 is not impaired by the cover 22.

In addition, such a shaping enables uncomplicated mounting of the cover 22, since it can simply be placed onto the holder 10.

Furthermore, the cover 22 comprises fastening tabs 24 in the region of the receptacle 18, as a result of which the GPS sensor 14 is prevented from being able to fall out of the receptacle 18. In the embodiment shown, three fastening tabs 24 are provided. One of them is located on the front side of the GPS sensor 14, and two fastening tabs are assigned to the sides of the GPS sensor 14.

The clamping apparatus 16 is in the form of a projection with two cutouts and comprises a passage opening 26, which may be embodied e.g. as a bore and serves to receive a fastener 20. The camera 12 can thus be screw-fastened to the clamping apparatus 16 with the aid of a threaded bush 28 (see FIG. 1). In the embodiment shown, the threaded bush 28 is integrated into the camera 12 or into the camera frame. Such a configuration of the clamping apparatus 16 also allows the camera 12 to be fixed in such a way that it is oriented in a direction of travel or counter to the direction of travel.

Furthermore, the clamping apparatus 16 comprises a cable leadthrough 32 for a cable 30 of the GPS sensor 14. In this embodiment, the GPS sensor is connected to a wiring harness (not illustrated) of the vehicle by way of a cable 30, as a result of which the GPS sensor 14 is supplied with energy. The cable 30 can be routed through the cable leadthrough 32, as a result of which improper cable kinking, which may result in damage to the cable, is prevented. Here, the cable leadthrough 32 is in the form of a rectangular passage opening at the foot of the projection of the clamping apparatus 16, however other geometries, e.g. a round shaping, are also conceivable. Should the GPS sensor 14 have an internal battery and no cable 30, the cable leadthrough 32 can be dispensed with, or it remains unused.

Figure 7:
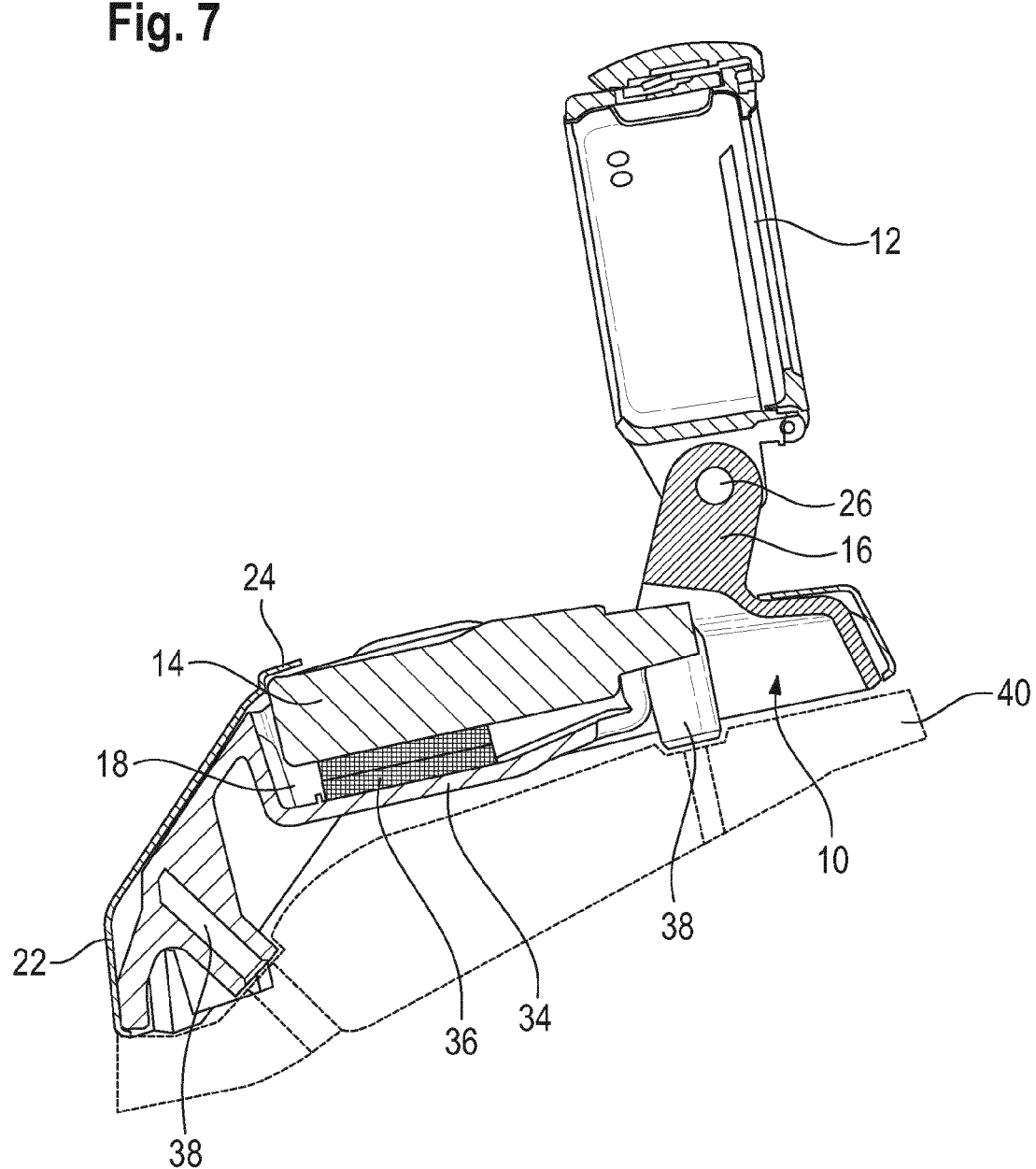
FIG. 7 shows a longitudinal section through the holder from FIG. 6.

The receptacle 18 for the GPS sensor is of shell-like design (see FIG. 7). The shape of the receptacle 18 is in this case adapted to the outer contour of the GPS sensor 14 and is in the form of a depression in the holder 10, such that only a small part of the GPS sensor 14 protrudes from the receptacle 18.

In addition, the receptacle 18 comprises a base 34 with a fastener 36. A counterpart to the fastener 36 is attached to the underside of the GPS sensor 14, the fastener being a hook-and-loop fastener in the embodiment shown. However, other fasteners are also conceivable, e.g. a magnet. The fastener 36 thus securely fixes the GPS sensor in the receptacle 18 and prevents slipping within the receptacle 18.

Figure 5:
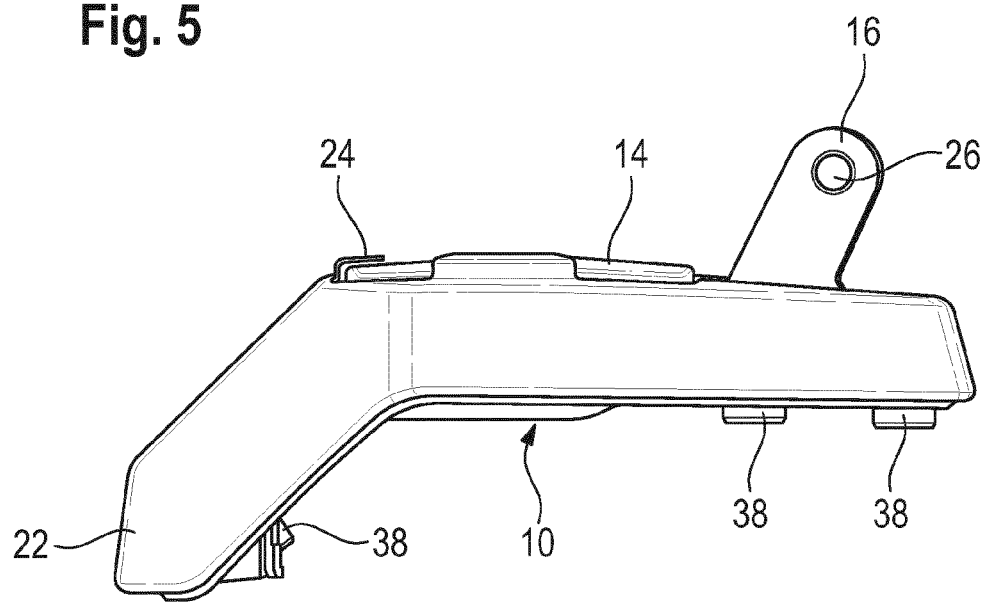
FIG. 5 shows a side view of the holder from FIG. 2.
Figure 6:
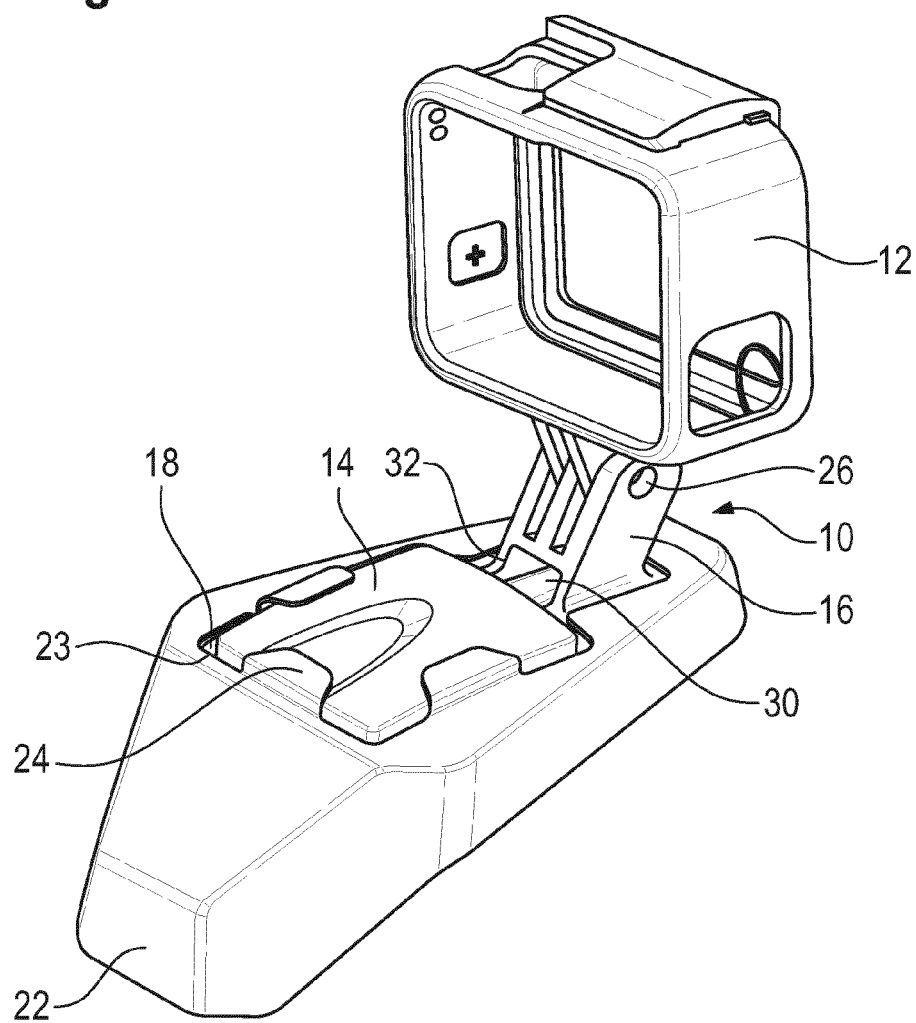
FIG. 6 shows a perspective view of the holder from FIG. 2 with camera.

The fastening shaping 38 is shown in FIGS. 5 and 7 and, said fastening shaping being able to be used to fasten the holder 10, which consists e.g. of plastic, to a schematically illustrated cladding component 40. In this preferred embodiment, the holder 10 is screwed to the cladding component 40 at three points. The fastening shaping 38 is therefore in the form of a bore. Preferably, the holder 10 is fastened from the inside to the cladding component 40 by a self-tapping plastics screw, with the result that a thread does not have to be manufactured. However, as an alternative thereto, it is also possible for a thread for screw-fastening to be provided in the corresponding bore in the cladding component 40, such that the holder 10 can be screw-fastened from the outside. However, as a further alternative thereto, it is also possible for the thread to be provided in the bore of the holder 10, such that the holder 10 is fastened to the cladding component 40 in some other way, e.g. by clamping by way of fastening tabs.

Figure 8:
FIG. 8 shows a motorcycle on which the holder is attached.

Preferably, as shown in FIG. 8, the holder 10 is attached to the outer cladding 40 at the rear of the vehicle 50, where the vehicle 50 is a motorcycle. Particularly in the case of motorcycles, such a location lends itself since here there are no components which disturb the camera 12. In the case of many motorcycles, a windshield and a headlamp are located at the front and the holder 10 would be located on the lateral cladding parts in the vicinity of the engine, where strong vibrations and high temperatures occur. A fastening of the holder 10 to the rear cladding 40 is therefore advantageous.

The invention claimed is:

1. A holder for combined holding of a camera and a GPS sensor on a motor vehicle, the holder comprising:
   a clamping apparatus for fixing of the camera; and
   a receptacle for the GPS sensor, wherein:
   the holder is provided with a fastening shaping for fastening the holder to a cladding component,
   the fastening shaping is configured to fasten the holder to the cladding component in a form-fitting manner, and
   the cladding component is an outer cladding.

2. The holder according to claim 1, wherein the motor vehicle is a motorcycle.

3. The holder according to claim 1, wherein a cover with an opening and at least one fastening tab is arranged on the holder.

4. The holder according to claim 1, wherein the clamping apparatus comprises a cable leadthrough for a cable of the GPS sensor.

5. The holder according to claim 1, wherein the clamping apparatus is in a form of a projection with a passage opening for a fastener.

6. The holder according to claim 1, wherein the receptacle for the GPS sensor is of a shell-like form.

7. The holder according to claim 1, wherein the receptacle for the GPS sensor comprises a base with a fastener.

8. The holder according to claim 7, wherein the fastener is in a form of a magnet or a hook-and-loop fastener.

9. The holder according to claim 1, wherein the holder is fastened to the cladding component by a screw connection.

10. The holder according to claim 1, wherein the outer cladding is a rear cladding.

11. A motor vehicle comprising:
    a cladding component; and
    a holder for combined holding of a camera and a GPS sensor, wherein:
    the holder comprises a clamping apparatus for fixing of the camera and a receptacle for the GPS sensor,
    the holder is arranged on the cladding component, and
    the cladding component is an outer cladding.

12. The motor vehicle according to claim 11, wherein the motor vehicle is a motorcycle.

* * * * *